(12) United States Patent
Navarro Fructuoso et al.

(10) Patent No.: US 11,726,346 B2
(45) Date of Patent: *Aug. 15, 2023

(54) FOCUS TUNABLE OPTICAL SYSTEM AND MULTI-FOCAL DISPLAY DEVICE

(71) Applicant: Huawei Technologies Co., Ltd., Shenzhen (CN)

(72) Inventors: Hector Navarro Fructuoso, Munich (DE); Atanas Boev, Munich (DE); Panji Setiawan, Munich (DE); Onay Urfalioglu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

This patent is subject to a terminal disclaimer.

(21) Appl. No.: 17/461,501

(22) Filed: Aug. 30, 2021

(65) Prior Publication Data

US 2021/0389603 A1    Dec. 16, 2021

Related U.S. Application Data

(63) Continuation of application No. 16/844,841, filed on Apr. 9, 2020, now Pat. No. 11,106,052, which is a
(Continued)

(51) Int. Cl.
*G02B 27/00* (2006.01)
*G02B 30/40* (2020.01)
(Continued)

(52) U.S. Cl.
CPC .............. *G02B 30/40* (2020.01); *G02B 7/06* (2013.01); *H04N 13/144* (2018.05);
(Continued)

(58) Field of Classification Search
CPC ...... G02B 30/40; G02B 7/06; G02B 27/0179; G02B 2027/0134; G02B 2027/0185;
(Continued)

(56) References Cited

U.S. PATENT DOCUMENTS 10,698,218 B1 *   6/2020   Geng .................. G02B 27/0172
2004/0114203 A1 *   6/2004   Batchko ............... G02B 5/1876
359/3
(Continued)

FOREIGN PATENT DOCUMENTS

CN         101300519 A      11/2008
CN         102566049 A       7/2012
(Continued)

OTHER PUBLICATIONS

"Fast Electrically Tunable Lens EL-10-30 Series," XP055484804, total 16 pages, Retrieved from the Internet: URL: https://www.stemmer-imaging.de/media/uploads/optics/10/102966-Optotune-EL-10-30.pdf, Optotune (Apr. 4, 2016).
(Continued)

*Primary Examiner* — Howard D Brown, Jr.
(74) *Attorney, Agent, or Firm* — Leydig, Voit & Mayer, Ltd.

(57) ABSTRACT

A focus tunable optical system includes a compound lens, which includes a plurality of focus tunable lenses. Further, the focus tunable optical system comprises a controller, which is configured to shift a focus of the compound lens from a first focal plane to a second focal plane. To this end, the controller is configured to apply, individually to each focus tunable lens of the plurality of the focus tunable lenses, a control signal having a first value for the first focal plane and a second value for the second focal plane.

11 Claims, 9 Drawing Sheets

Related U.S. Application Data continuation of application No. PCT/EP2017/075697, filed on Oct. 9, 2017.

(51) Int. Cl.
| | |
|---|---|
| *H04N 13/167* | (2018.01) |
| *H04N 13/144* | (2018.01) |
| *H04N 13/351* | (2018.01) |
| *H04N 13/398* | (2018.01) |
| *G02B 7/06* | (2021.01) |

(52) U.S. Cl.
CPC ......... *H04N 13/167* (2018.05); *H04N 13/351* (2018.05); *H04N 13/398* (2018.05)

(58) Field of Classification Search
CPC .... G02B 3/14; G02B 27/0075; H04N 13/144; H04N 13/167; H04N 13/351; H04N 13/398
See application file for complete search history.

(56) References Cited

U.S. PATENT DOCUMENTS

| | | | |
|---|---|---|---|
| 2007/0263293 | A1 | 11/2007 | Batchko et al. |
| 2008/0278808 | A1 | 11/2008 | Redert |
| 2012/0113092 | A1 | 5/2012 | Bar-Zeev et al. |
| 2015/0061976 | A1 | 3/2015 | Ferri |
| 2015/0235468 | A1 | 8/2015 | Schowengerdt |
| 2016/0147078 | A1 | 5/2016 | Bedard et al. |
| 2018/0199028 | A1 | 7/2018 | Ratcliff et al. |
| 2019/0339526 | A1 | 11/2019 | Welch |

FOREIGN PATENT DOCUMENTS

| | | |
|---|---|---|
| CN | 106233189 A | 12/2016 |
| CN | 107193126 A | 9/2017 |
| WO | 0233657 A2 | 4/2002 |

OTHER PUBLICATIONS

"DLP Technology for Near Eye Display—White Paper," total 17 pages, Texas Instruments Incorporated (Sep. 2014).

Kramida, "Resolving the Vergence-Accommodation Conflict in Head-Mounted Displays," IEEE Transactions on Visualization and Computer Graphics, vol. 22, No. 7, pp. 1912-1931, Institute of Electrical and Electronics Engineers, New York, New York (Jul. 2016).

Lambooij et al., "Visual Discomfort and Visual Fatigue of Stereoscopic Display: A Review," Journal of Imaging Science and Technology, vol. 53, No. 3, pp. 1-14 (2009).

Hu et al., "Design and Assessment of a Depth-Fused Multi-Focal-Plane Display Prototype," Journal of Display Technology, vol. 10, No. 4, pp. 308-316 (Apr. 2014).

Wu et al., "Content-Adaptive Focus Configuration for Near-Eye Multi-Focal Displays," 2016 IEEE Intl. Conf. on Multimedia and Expo (ICME), pp. 1-6, Institute of Electrical and Electronics Engineers, New York, New York (Jul. 2016).

Narain et al., "Optimal Presentation of Imagery with Focus Cues on Multi-Plane Displays," in ACM Transactions on Graphics, vol. 34, No. 4, Article 59, pp. 1-12 (Aug. 2015).

"Fast Electrically Tunable Lens EL-10-30-Series," Datasheet: EL-10-30-Series, pp. 1-16, Optotune (Jan. 4, 2017).

Shibata et al., "The zone of comfort: Predicting visual discomfort with stereo displays," in J. Vis., 2011; 11(8): 11. doi: 10.1167/11.8.11, pp. 1-53 (Jul. 2011).

TI training and videos >Applications and designs, Retrieved from the internet:http://www.ti.com/general/docs/video/watch.tsp?entryid=5157963226001, pp. 1-2, Retrieved on: Mar. 18, 2020.

Sommerich, "How DLP Works," Tutorial, pp. 64-65, AV Asia Pacific Magazine (2009).

"Principles of Time Domain Imaging," pp. 1-19, Forth Dimension Displays Limited, United Kingdom (Dec. 19, 2013).

\* cited by examiner

FOCUS TUNABLE OPTICAL SYSTEM AND MULTI-FOCAL DISPLAY DEVICE

CROSS-REFERENCE TO RELATED APPLICATIONS

This application is a continuation of U.S. patent application Ser. No. 16/844,841, filed on Apr. 9, 2020, which is a continuation of International Application No. PCT/EP2017/075697, filed on Oct. 9, 2017. All of the afore-mentioned patent applications are hereby incorporated by reference in their entireties.

FIELD

The disclosure relates to a focus tunable optical system, for example, suitable for a Multi-Focal Display (MFD) device. The disclosure relates also to a MFD device including the focus tunable optical system. The MFD device of the disclosure can be employed in a Near Eye Display (NED) device, in a Near-To-Eye (NTE) application or device, or in a Head Mounted Display (HMD) device. The disclosure also relates to a method for controlling the focus tunable optical system. The disclosure relates generally to controlling a combined focus of a compound lens included in the focus tunable optical system.

BACKGROUND

MFD devices are designed to provide a personal viewing experience while being small and portable. MFD devices may be employed in the categories of Augmented Reality (AR) as well as Virtual Reality (VR). AR typically uses a see-through NED device. VR typically uses an immersive NED device.

SUMMARY

An example of an MFD device (here, a NED device) is shown in FIG. 8. A viewing distance of a single 2D display from the eye(s) of a user is rapidly switched in synchronization with the rendering of frames of multiple focal planes, thereby creating a perceived three-dimensional (3D) image. Ideally, the perceived 3D image is flicker-free.

The MFD device includes a high-speed focal modulator element for switching the viewing distance of the 2D display. The focal modulator element may include a focus tunable lens for continually adjusting or modulating the focal length or optical power of the lens. For instance, an electrically focus tunable lens or a deformable membrane mirror device (DMMD) may be used as the focus tunable lens.

The example of an MFD device of FIG. 8 further includes an ultrafast display element, which includes, for instance, a Digital Micromirror Device (DMD) or a Liquid Crystal on Silicon (LCOS), e.g., a Ferroelectric LCOS (FCLOS). The display element is used to sequentially display color images at a frame rate above a flicker fusion threshold, e.g., at a frame rate of at least 60 Hz. The MFD device may further includes a controller for controlling both the display element and the focus tunable lens of the focal modulator element.

The focus tunable lens can be controlled to define a series of successive discrete focal planes. More specifically, the focus tunable lens is able to change its focal distance, in order to selectively focus on one of a plurality of focal planes of different index. The discrete focal planes divide a 3D scene volume into multiple zones along the visual axis. Virtual objects within a zone are rendered by the corresponding pair of adjacent focal planes, so that 2D perspective images of these objects are displayed at a nearly correct focal distance. Focal distance is the distance between the center of the lens and the focal plane. Hence, by tuning the focal distance of the focus tunable lens, it is possible to generate an image on any selected one of the focal planes.

FIG. 9 shows an example of a scheme of controlling a plurality of focal planes (here, four focal planes, with indices 1 to 4 are illustrated) can be controlled over time (x-axis). The optical power D of the focus tunable lens is plotted in FIG. 10 (on the y-axis). The optical power D can be adjusted by changing the value of control signal applied to the lens. For example, the signal may be an electrical current that is driven through the lens. The focal planes (optical power) can thus be varied by varying the intensity of the electrical current, one current intensity level for each optical power level of the lens. Accordingly, for generating optical power steps (i.e. jumps between two focal planes), in order to rapidly change between different focal planes, a control signal in the form of a current step may be applied.

All of the used focal planes may be selected once during a frame period of, e.g., 1/60 s. While a given focal plane is selected (or "active"), color information (here indicated by 'RGB') may be transmitted. In the example of four focal planes, this needs to be done at a frame period of 1/60 s within 4.2 ms.

Unfortunately, as can be seen from a datasheet by Optotune ("*Datasheet: EL-10-30-Series Fast Electrically Tunable Lens, Update:* 31 May 2017"), due to lens inertia, a significant oscillation artifact (overshoot+ringing) can appear in the optical response of a focus tunable lens. The oscillation artifact may be characterized by a rise time and a settling time. For example, FIG. 12 of the EL-10-30 datasheet shows the optical response (change of optical power) of a focus tunable lens when the current intensity is increased from a value of 0 mA to values of either 100 mA, 150 mA or 200 mA, respectively. A pronounced overshoot and ringing, which is stronger when a higher current step is applied, can be observed. The same is observable for the opposite direction of the current step, i.e. for a decrease of the current value. The focus tunable lens may therefore give an optical response that is distorted, the distortion depending on the height of the current step of the control signal that is applied to the lens. The greater the oscillation artifact on the optical response of the lens, the longer the settling time will be.

FIG. 13 of the EL-10-30 datasheet further shows that the frequency response of an oscillating current (from 50-150 mA) shows resonant frequencies, which are actually the cause of the pronounced artifacts shown in FIG. 12 of the EL-10-30 datasheet. These artifacts can seriously affect the image quality of the MFD device, particularly with respect to flicker of the produced multifocal display.

The above-described problem has been addressed by applying preprocessing methods to enhance the optical and frequency response of the focus tunable lens. However, these methods may be insufficient to guarantee a high image quality, especially in a MFD device.

In view of the above mentioned problems and disadvantages, the present disclosure provides an improved MFD device and method. The present disclosure provides a focus tunable optical system for an MFD device, and an MFD device, which are able to provide a multifocal display with improved image quality, particularly with less flickering.

The impact of oscillation artifacts occurring at a transition between focal planes of the focus tunable lens should be reduced, if not eliminated.

The disclosure provides for the use of multiple focus tunable lenses combined in a lens assembly (compound lens) instead of a single focus tunable lens.

A first aspect of the disclosure provides a focus tunable optical system. The optical system includes a compound lens, which includes a plurality of focus tunable lenses, and a controller. The controller is configured to shift a focus of the compound lens from a first focal plane to a second focal plane by applying, individually to each focus tunable lens of the plurality of focus tunable lenses, a control signal having a first value for the first focal plane and the second value for the second focal plane.

The multiple focus tunable lenses are cascaded (i.e. placed one after the other) in the compound lens. The optical power of the compound lens is therefore the sum of the optical powers of the plurality of focus tunable lenses of the compound lens. Each one of the focus tunable lenses is controlled individually by a control signal. Different control signals may be applied to different focus tunable lenses. The individual control of each of the lenses results in a combined optical response of the compound lens. Each of the focus tunable lenses of the compound lens can be driven by a significantly lower current step than a single focus tunable lens, to obtain the same overall optical response (optical power change). Therefore, the assembly of the focus tunable lenses also shows less artifacts on the combined optical response, and accordingly achieves shorter (faster) settling times for the same optical power changes than a single focus tunable lens. The faster settling time leads to considerably less flicker, and a better image quality.

In an implementation form of the first aspect, the controller is configured to apply the control signals to the plurality of the focus tunable lenses in a time-shifted manner. The applied control signals will thus be time-shifted relative to each other.

Thereby, a spurious overshoot in shifting the focus of the compound lens from the first focal plane to the second focal plane can be significantly reduced. As a consequence, the image quality is further improved.

In the further implementation form of the first aspect, the controller is configured to apply the control signals to the plurality of focus tunable lenses in a time-shifted manner by use of one or more delay elements or by digital signal processing.

Preferably the focus tunable lenses of the compound lens are of the same size. Assuming same size lenses, by additionally preforming a time offset by controlling the focus tunable lenses in a time-shifted manner, a better optical response can be achieved because oscillation artifacts of each of the lenses may naturally cancel each other. This contributes to a faster settling time and an improved image quality.

In a further implementation form of first aspect, the controller is configured to apply the control signals to the plurality of focus tunable lenses with equal time shifts between any two successive control signals.

It is generally noted that the plurality of the focus tunable lenses of the first aspect does not necessarily include all lenses of the compound lens. In other words, the compound lens may include further lenses, which may either be controlled in a time-shifted manner as well, or in another manner, e.g., synchronously with other lenses. That is, it is possible that two or more focus tunable lenses of the compound lens are controlled with control signals that are not time-shifted relative to another, while two or more other focus tunable lenses of the compound lens are controlled with control signals that are time-shifted relative to another.

In a further implementation form of the first aspect, the focus tunable lenses have a same natural oscillation frequency $f=1/T$, T being the corresponding oscillation period, and each of the equal time shifts equals T divided by the number of the focus tunable lenses included in the plurality of focus tunable lenses.

Thus, there will be a phase shift of 360°/(number of lenses) between any two successive control signals. The oscillation effects of the lenses will cancel each other at least partially, leading to an improved image quality.

A second aspect of the disclosure provides a MFD device. The MFD device includes a focus tunable optical system according to the first aspect or any of its implementation forms. The controller is configured to selectively tune the focus of the compound lens to a plurality of focal planes during a frame period, the focal planes having indices 1 to N assigned to them in increasing or decreasing order of their focal distances. The controller is configured to tune the focus of the compound lens by applying, individually to each of the focus tunable lenses of the plurality of focus tunable lenses, a control signal having a different value for each focal plane index.

The indices 1 to N are used in the present disclosure merely to identify each focal plane in a simple manner for the purpose of description. That is, the indices 1 to N are names or identifiers of the focal planes, which are assigned to the focal planes in accordance with the respective focal distances (either ascending or descending). This assignment of indices is done by the present disclosure itself and should not be construed as an operation performed by the MFD device 300 or by any other physical unit. In other words, the indices are descriptors, not technical features.

Since the MFD device of the second aspect uses the focus tunable optical system of the first aspect, it benefits from all the advantages and affects described above.

In an implementation form of the second aspect, the MFD device further includes a display element configured to generate an image. The controller is configured to control the display element to generate a different image for each focal plane index during the frame period.

The final 3D image that results from a combination the different images for each focal plane index will show less flickering due to the reduced oscillation artifacts and faster settling times achieved, when controlling the focus of the compound lens to the corresponding focal planes.

A third aspect of the disclosure provides a method for controlling a focus tunable optical system. The method includes shifting a focus of a compound lens from a first focal plane to a second focal plane by applying, individually to each focus tunable lens of a plurality of focus tunable lenses of the compound lens, a control signal having a first value for the first focal plane and a second value for the second focal plane.

In an implementation form of the second aspect, the method includes applying the control signals to the plurality of the focus tunable lenses in a time-shifted manner, so that the applied control signals are time-shifted relative to each other.

In the further implementation form of the second aspect, the method includes applying the control signals to the plurality of focus tunable lenses in a time-shifted manner by use of one or more delay elements or by digital signal processing.

In a further implementation form of second aspect, the method further includes applying the control signals to the plurality of focus tunable lenses with equal time shifts between any two successive control signals.

In a further implementation form of the first aspect, the focus tunable lenses have a same natural oscillation frequency f=1/T, T being the corresponding oscillation period, and each of the equal time shifts equals T divided by the number of the focus tunable lenses included in the plurality of focus tunable lenses.

The method of the third aspect and its implementation forms achieve all advantages and effects described above for the focus tunable optical system of the first aspect and its respective implementation forms.

A fourth aspect of the disclosure provides a computer program product comprising a program code for controlling a focus tunable optical system according to the first aspect or any of its implementation forms or for controlling a MFD devise according to the second aspect or its implementation form.

Accordingly, the same advantages as described above for the first and second implementation forms, respectively, are achieved.

It has to be noted that all devices, elements, units and means described in the present application may be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms will be explained in the following description of exemplary embodiments in relation to the enclosed drawings, in which.

DETAILED DESCRIPTION

Figure 1:
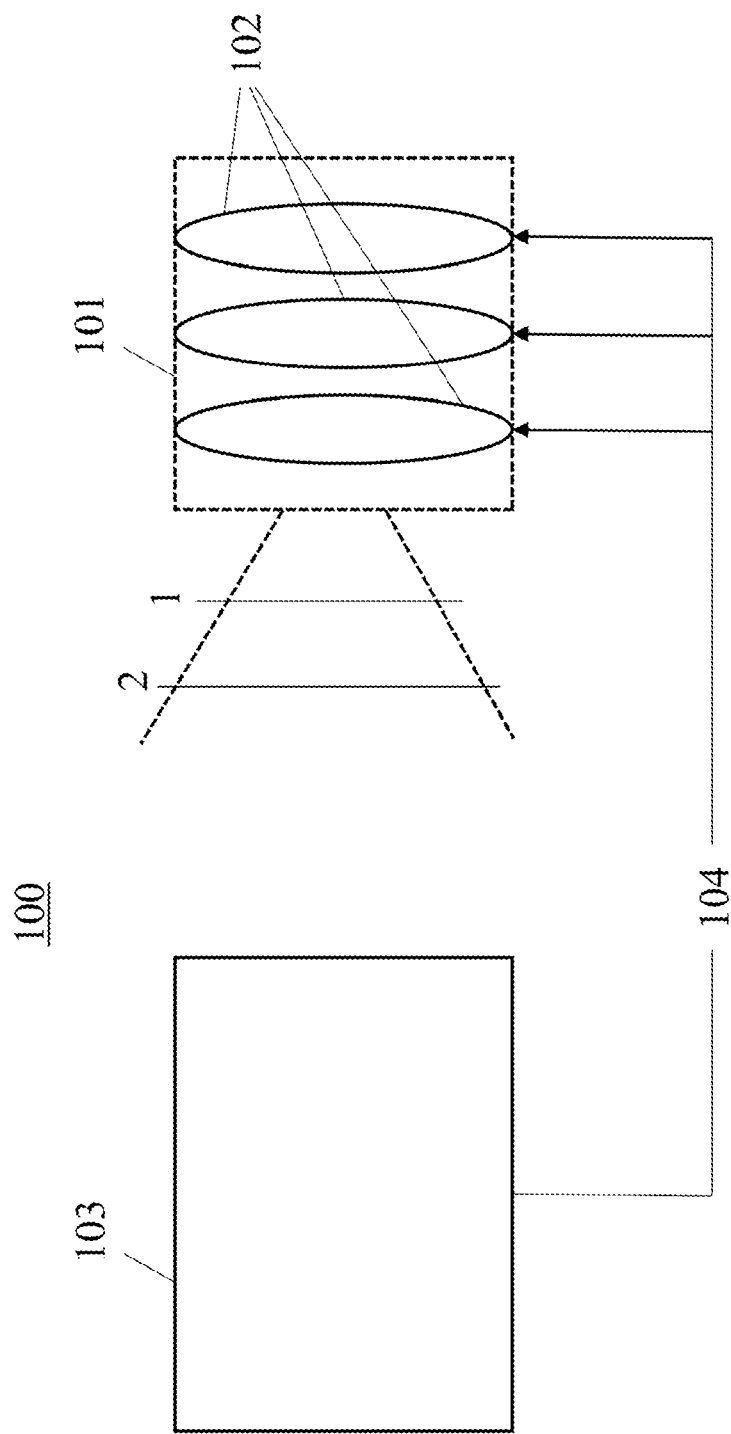
FIG. 1 shows a focus tunable optical system according to an embodiment of the disclosure.

FIG. 1 shows a focus tunable optical system 100 according to an embodiment of the disclosure. The focus tunable optical system 100 may be used in an MFD device, e.g., in an NED device, NTE device, or HMD device.

The focus tunable optical system 100 includes a compound lens 101, which comprises a plurality of focus tunable lenses 102. These focus tunable lenses 102 are cascaded in the compound lens 101, i.e. the focus tunable lenses 102 are placed one after the other in the compound lens 101. In particular, the lenses 102 are arranged in series along a common optical axis of the compound lens 101. As a consequence, the total optical power of the compound lens 101 is equal to the sum of the individual optical powers of the multiple focus tunable lenses 102 of the compound lens 101. Preferably, each one of the plurality of focus tunable lenses 102 of the compound lens 101 has the same size. However, it is also possible that lens sizes, particularly height and thickness, of at least two or of any two focus tunable lenses 102 differ from another.

The focus tunable optical system 100 further comprises a controller 103, which may be a computer processor or a microcontroller or the like. The controller 103 is configured to shift a focus of the compound lens 101 from a first focal plane to a second focal plane (as indicated in FIG. 1, the two focal planes may have indices 1 and 2, respectively). In particular the controller 103 is configured to apply, individually to each focus tunable lens 102 of the plurality of focus tunable lenses 102 of the compound lens 101, a control signal 104. Each control signal 104 has a first value for the first focal plane and a second value for the second focal plane. Control signals 104 of two of the lenses 102 may be the same or may be different. That is, the controller 103 may be configured to apply at least two different control signals 104 to at least two different focus tunable lenses 102 of the compound lens 101, respectively. Each of the focus tunable lenses 102 can be individually controlled to produce a certain optical response of the respective lens 102, which will contribute to a combined optical response of the compound lens 101. For achieving a certain optical power change of the compound lens 101, the optical power change of each of the lenses 102 can be small compared to the total optical power change of the compound lens 101. Since accordingly each focus tunable lens 102 can be controlled with a much lower current step (or generally current intensity difference) than a single focus tunable lens having the same optical power as the compound lens 101, a shorter settling time and improved image quality can be obtained.

Figure 2:
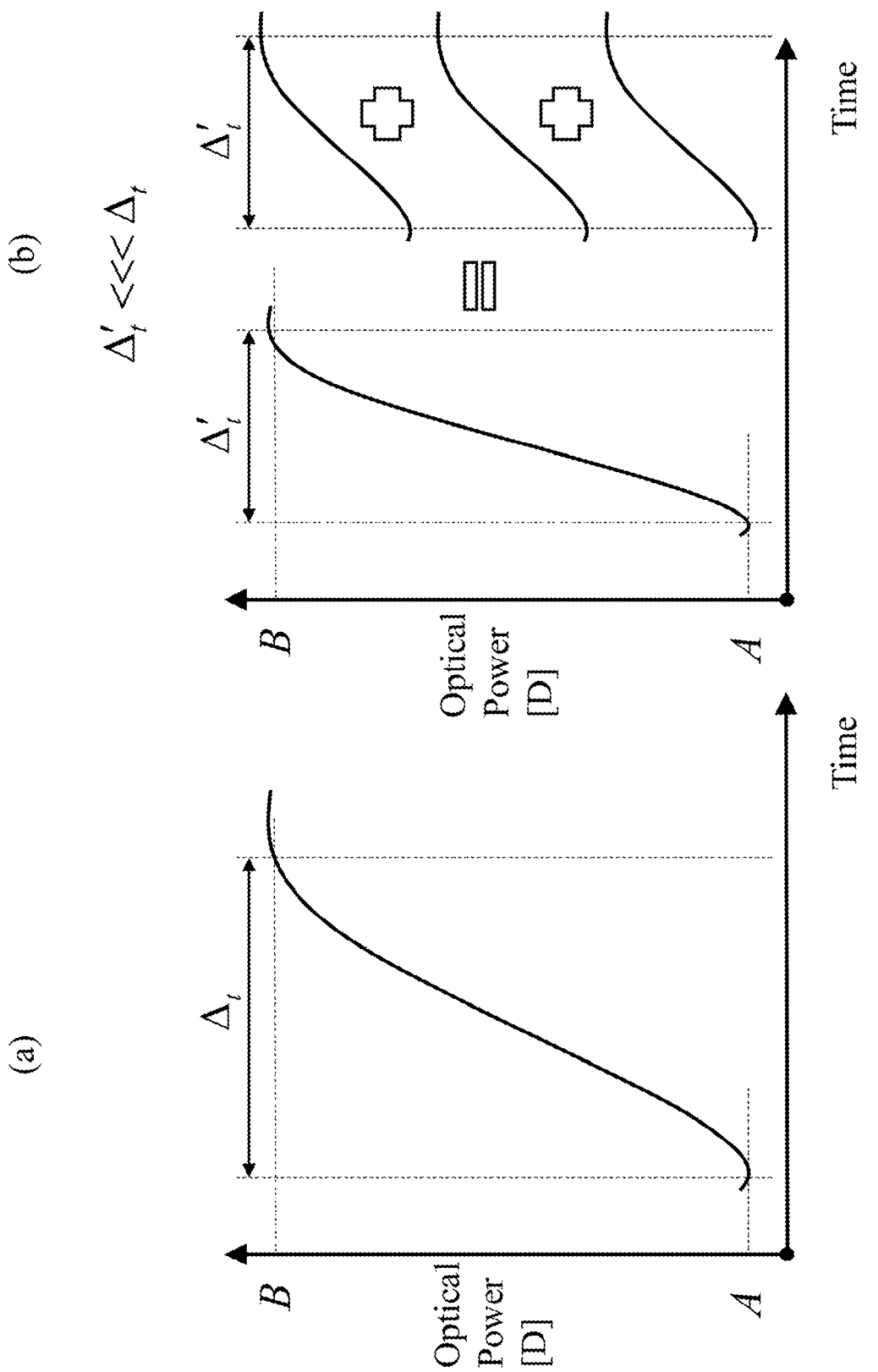
FIG. 2 shows identical optical response for a single focus tunable lens in an example of a focus tunable optical system and for a plurality of focus tunable lenses in a focus tunable optical system according to an embodiment of the disclosure.

FIG. 2 shows, as an example, a change of the optical power D from an optical power A to an optical power B for a single focus tunable lens in a single-lens system (FIG. 2A) compared to the same optical power change of a compound lens 101 including three focus tunable lenses 102 in a focus tunable optical system 100 (FIG. 2B). In particular, FIG. 2 illustrates that the single focus tunable lens has a certain settling time Δt for the transition from the optical power A to the optical power B. FIG. 2 shows further that the multiple lens system 101 of the focus tunable system 100 can achieve the same optical power transition from A to B with a significantly shorter settling time Δt'. This is due to the fact that the three lenses 102 are cascaded in the compound lens 101, and that each lens 102 can be individually driven with a significantly lower current intensity difference than the single focus tunable lens in the single-lens system, in order to achieve in both cases the same overall optical power change. The individual optical power change of each lens 102 does not need to cover the whole range from optical power A to optical power B, since the optical powers of the three lenses 102 sum up in the compound lens 101. That is, while the compound lens 101 as a whole may change its optical power from A to B, each individual lens 102 will change its optical power by a considerably smaller amount. The individual current intensity differences $\Delta I_1$, $\Delta I_2$ and $\Delta I_3$ for the three lenses 102 are consequently also smaller than the current intensity change ΔI required for the single lens. Therefore, significantly shorter settling times and less ringing are obtained. Accordingly, using the compound lens 101 instead of a single focus-tunable lens results in a focus tunable optical system 100 with an improved image quality.

Figure 3:
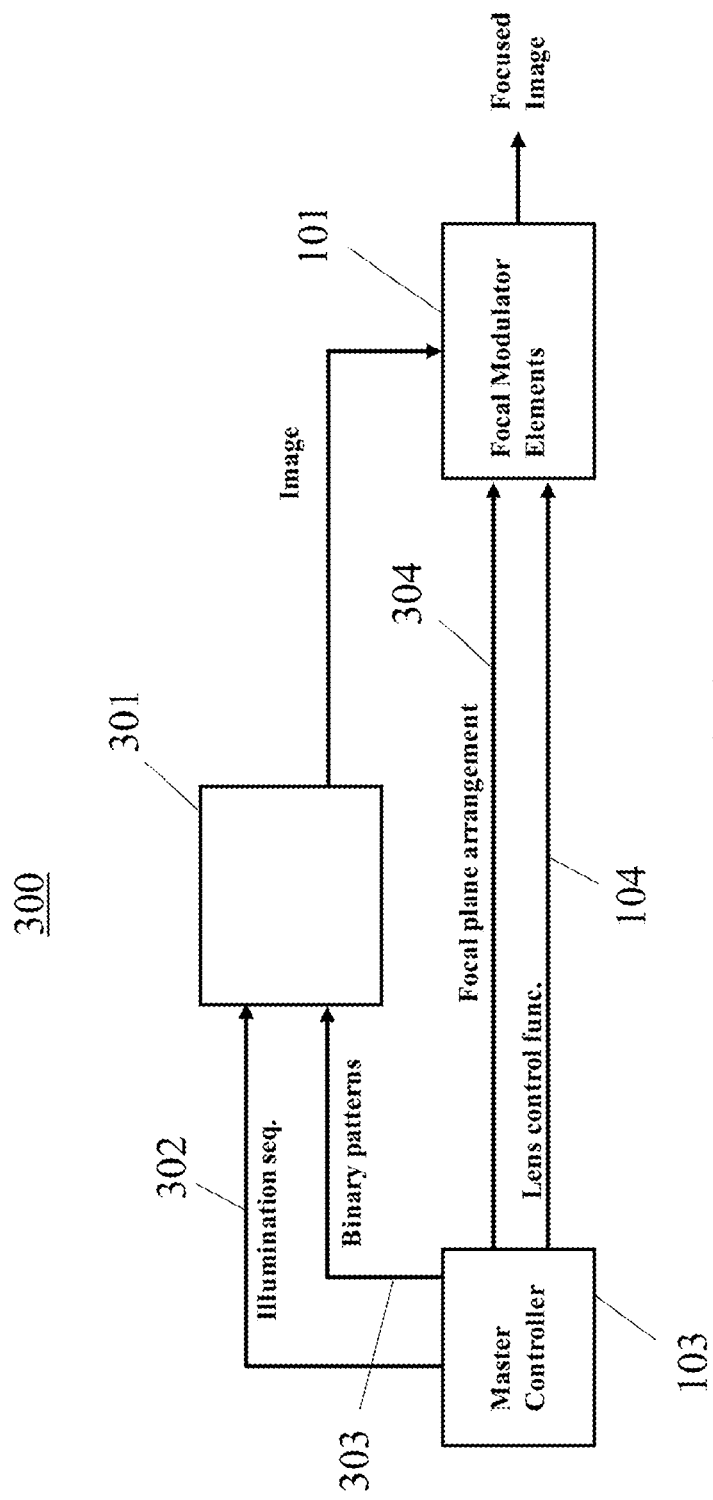
FIG. 3 shows an MFD device according to an embodiment of the disclosure.

FIG. 3 shows an MFD device 300 according to an embodiment of the disclosure. The MFD device 300 includes the focus tunable optical system 100 comprising the compound lens 101 (here it is labelled as 'focal modulator elements') and the controller 103. The controller 103 is configured to tune the focus of the compound lens 101 by applying control signals 104 to each of the lenses 102 of the compound lens 101, and for each focal plane index. That is, the controller 103 is configured to selectively tune the focus of the compound lens 101 to a plurality of N focal planes during a frame period. Indices 1 to N may be assigned to the N focal planes in increasing or decreasing order of their respective focal distances. The controller 103 is configured to tune the focus of the compound lens 101 by applying, individually to each of the focus tunable lenses 102 of the compound lens 101, a control signal 104 having a different value for each focal plane index. For instance, the controller 103 may apply a control signal 104 with varying (preferably step-wise varying) electrical current intensity to each lens 102. In order to tune the compound lens 101 to different focal planes, the controller 103 may provide a sequence of current steps or may provide a determined current intensity pattern to each lens 102.

The controller 103 is preferably also configured to provide a focal plane arrangement 304 to the compound lens 101, for instance in the form of specific selected focal plane groups. That is, by selecting a focal plane group for each frame period, wherein each focal plane group includes a sequence of focal planes, the controller 103 may effectively provide an ongoing sequence of repeating focal planes to each of the lenses 102.

The controller 103 of the MFD device 300 of FIG. 3 is preferably also configured to control a display element 301 of the MFD device 300, by providing for instance an illumination sequence 302 and a binary pattern 303. The binary pattern 303 may provide the display element 301, which may comprise a DMD device, with different images, preferably with images for different bit planes of different significance, wherein the different bit planes are combined by the MFD device 300 into a final image. Further, the illumination sequence 302 may correspond to the binary pattern 303, and may provide the display element 301 with an instruction about how brightly each bit plane image should be illuminated. More specifically, the illumination sequence may control an LED included in the display element 301 and/or also a color element, which may be used to provide the illumination light with a specific color for each bit plane image.

The image produced by the display element 300 is provided to the focus modulator element, i.e. to the compound lens 101, wherein an image is provided for each focal plane that is selectively set during a frame period. The compound lens 101 then focuses each image to the corresponding focal plane, in order to provide a focused image, and thus to provide overall the impression of a 3D image. This 3D image will be of improved image quality, due to less flickering achieved by the compound lens 101 as described above.

Figure 4:
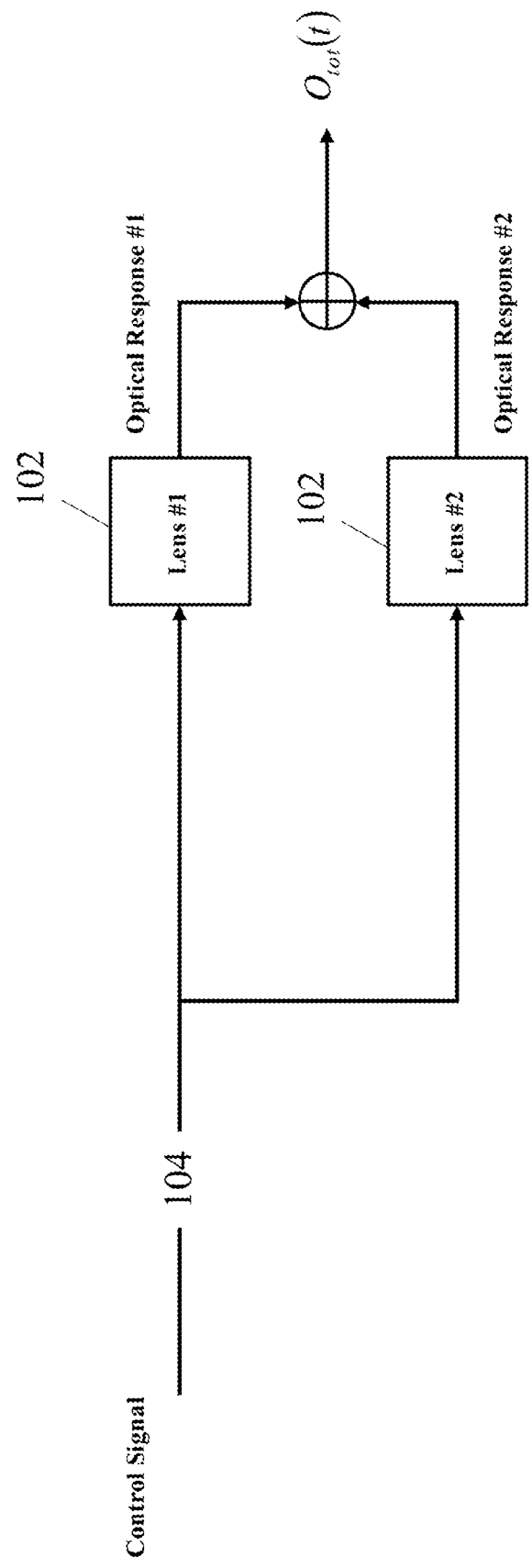
FIG. 4 shows how a control signal is applied to multiple focus tunable lenses in the focus tunable optical system according to an embodiment of the disclosure.

FIG. 4 shows schematically how, in the focus tunable optical system 100 according to an embodiment of the disclosure, a control signal 104 is applied individually to multiple focus tunable lenses 102. Here, an exemplary embodiment with a first focus tunable lens (Lens #1) and a second focus tunable lens 102 (Lens #2) is illustrated. The two focus tunable lenses 102 are arranged in series in the compound lens 101, and each lens 102 is driven by the control signal 104. The control signal 104 is here the same for both lenses 102. Also the two lenses 102 may be the same, i.e. they may have the same optical responses and/or at least the same dimensions. In the exemplary embodiment of FIG. 4, no time shift is introduced between the control signals 104 applied to the two lenses 102, i.e. the lenses 102 are controlled synchronously. Each one of the lenses 102 produces an optical response when controlled with the control signal 104. The two optical responses (Optical Response #1 and Optical Response #0.2) add up to produce the combined optical response of the compound lens 101. In the system 100 of FIG. 4, the two focus tunable lenses 102 should be spaced as close as possible together, however, without any mechanical interference, i.e. without one lens 102 touching the other at any time. As the two lenses 102 are operated synchronously in this example of an embodiment, the artifacts in their combined optical response may not compensate but add up. Nevertheless, the resulting total artifact may be smaller than the artifact produced by a single focus-tunable lens having the same optical power as the compound lens comprising the two lens 102 due to the fact that the amplitude of artifacts may depend on the amplitude of the control signal in a non-linear manner.

Alternatively, a time shift may be introduced between control signals 104. That is, generally the controller 103 may be configured to apply control signals 104 to the plurality of focus tunable lenses 102 in a time-shifted manner, so that the applied control signals 104 are time-shifted relative to each other. This can be done in the exemplary embodiment of the two control signals 104 shown in FIG. 4, or for any other embodiment with more than two control signals 104, i.e. with more than two lenses 102 in the compound lens 101. The controller 103 may be configured to apply a delay by use of one or more delay elements 600, or by digital signal processing, such as introducing a phase shift to a control signal 104.

Figure 5:
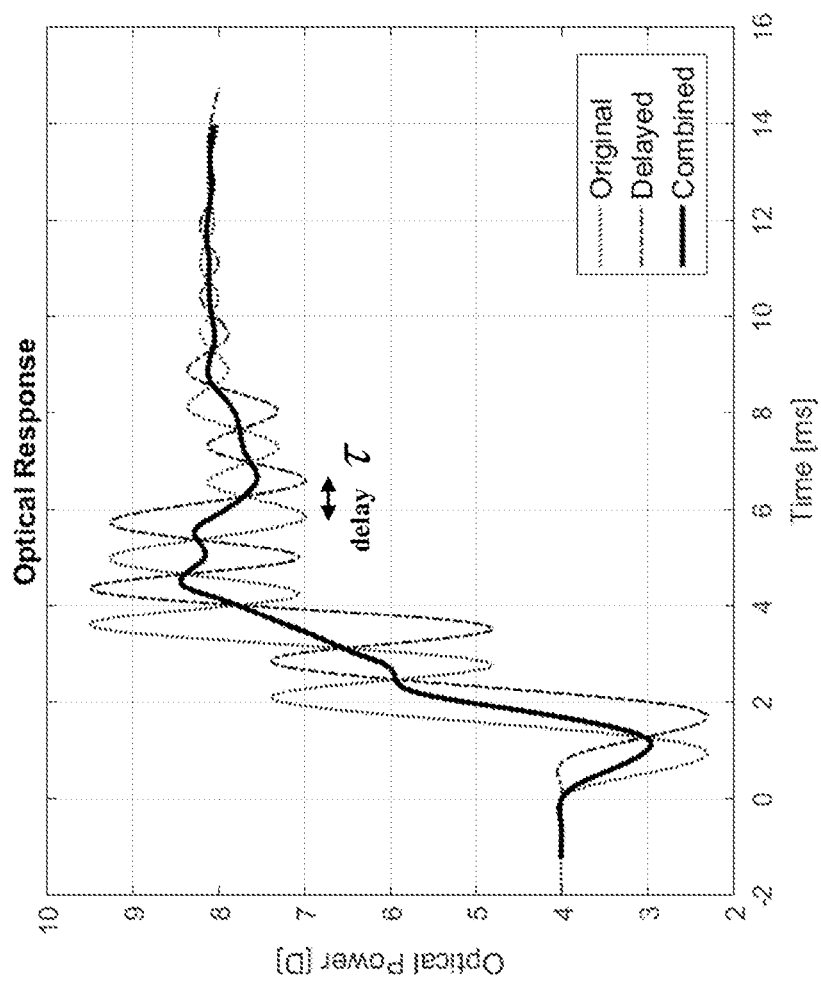
FIG. 5 shows an optical response of a compound lens of a focus tunable optical system according to an embodiment of the disclosure compared to an optical response of a single focus tunable lens.

FIG. 5 shows the result of introducing a time delay operation between two control signals 104 of a focus tunable system 100 as shown in FIG. 4. The result is an improved combined optical response. Specifically, as shown in FIG. 5, an original (not delayed) control signal 104 is applied to one lens 102 and a delayed control signal 104 is applied to the other lens 102. The delay is indicated in FIG. 5 by τ. The delaying of the one control signal 104 also delays the corresponding optical response of the lens 102. That is, an original optical response is obtained for one lens 102 and a delayed optical response is obtained for the other lens 102. Together, these optical responses combine into an improved optical response of the compound lens 101. The combined optical response of compound lens 101 shows less oscillations and has a shorter settling time.

Figure 6:
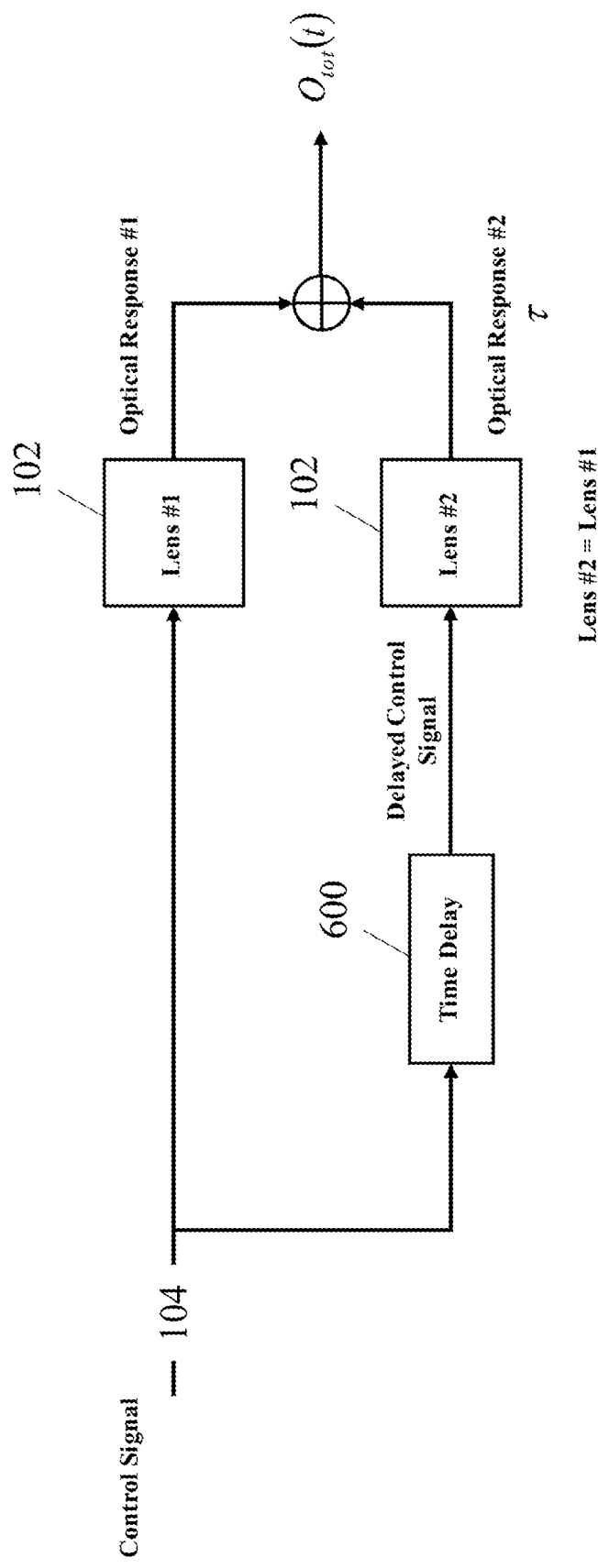
FIG. 6 shows how a control signal is applied in a time-shifted manner to multiple focus tunable lenses in a focus tunable optical system according to an embodiment of the disclosure.

FIG. 6 shows schematically how in the focus tunable optical system 100 according to an embodiment of the disclosure, one of the control signals 104 applied to one of the two lenses 102 can be delayed. In the example, a time delay element 600 delays the control signal 104 applied to one of the lenses 102 (Lens #2). The time delay element 600 may be replaced by signal processing to cause the delay. The optical responses of the two lenses 102 (not delayed Optical Response #1 and Optical Response #2 delayed by τ) combine to the overall optical response of the compound lens 101. An optimal or suitable value of the delay τ may be determined experimentally or numerically, for example, using a Monte Carlo method. For example, different delays may be applied as candidate delays and corresponding settling times of the overall optical response may be determined experimentally or theoretically. Among the candidate delays, the one that minimizes the combined settling time may be selected as the delay to be implemented in practice.

Time-shifted control signals 104 can also be beneficially applied to a compound lens that comprises more than two lenses 102. For instance, the controller 103 may be configured to apply the control signals 104 to the plurality of the focus tunable lenses 102 with equal time shifts between any two successive control signals 104. In another embodiment, the time shifts are not equal.

Figure 7:
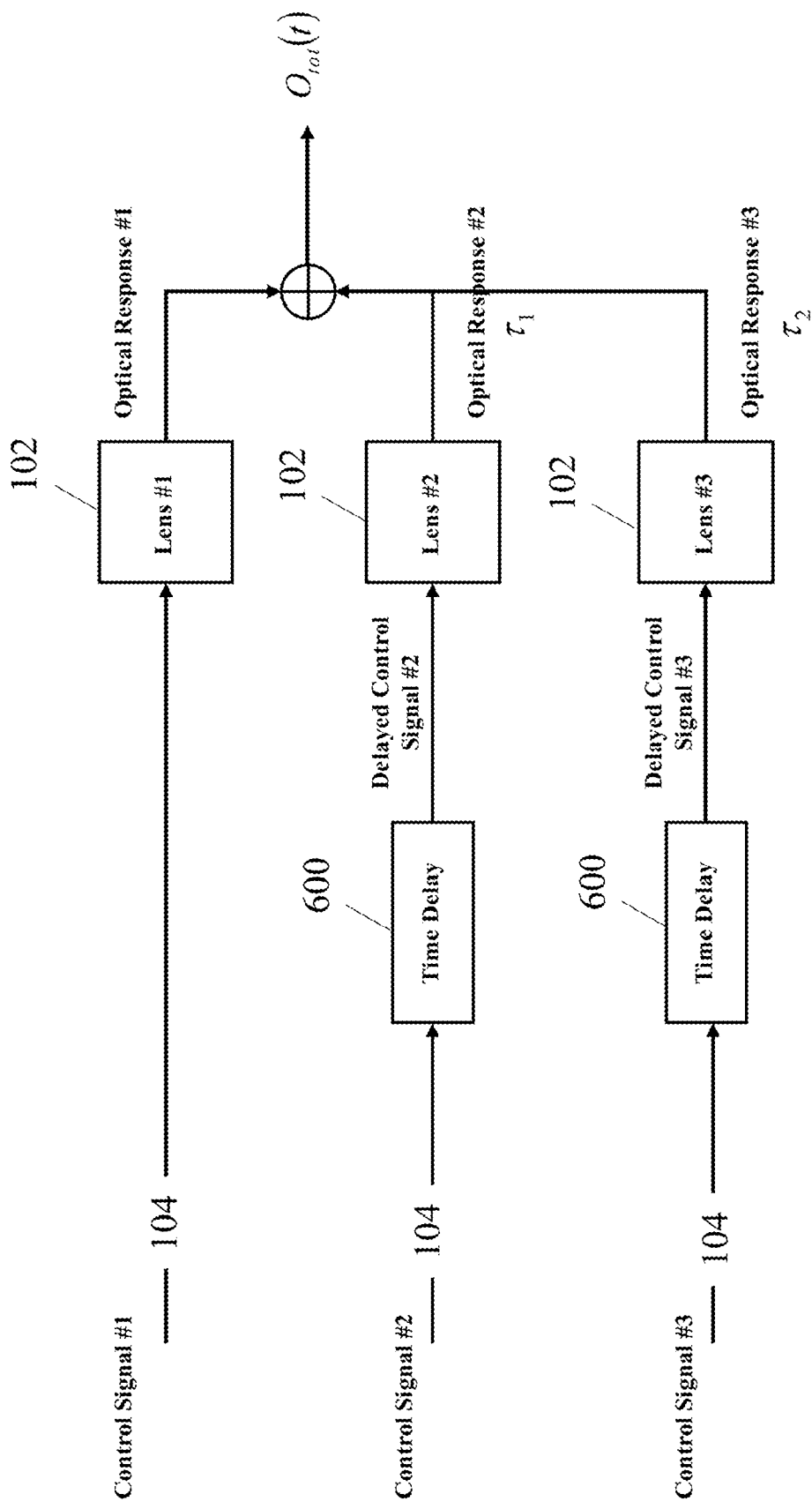
FIG. 7 shows how different control signals are applied in a time-shifted manner to multiple focus tunable lenses in a focus tunable optical system according to an embodiment of the disclosure
Figure 8:
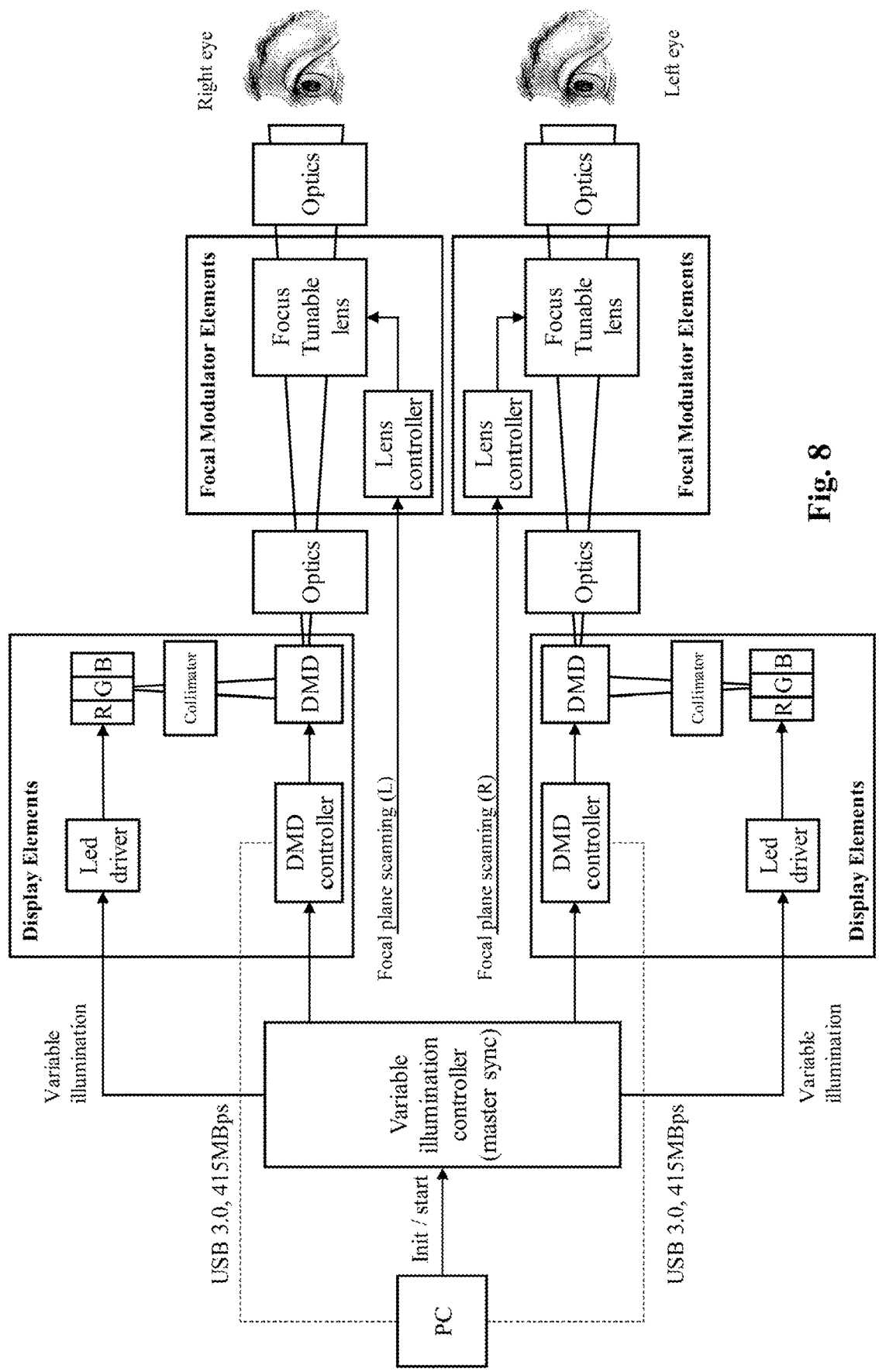
FIG. 8 shows an MFD device.
Figure 9:
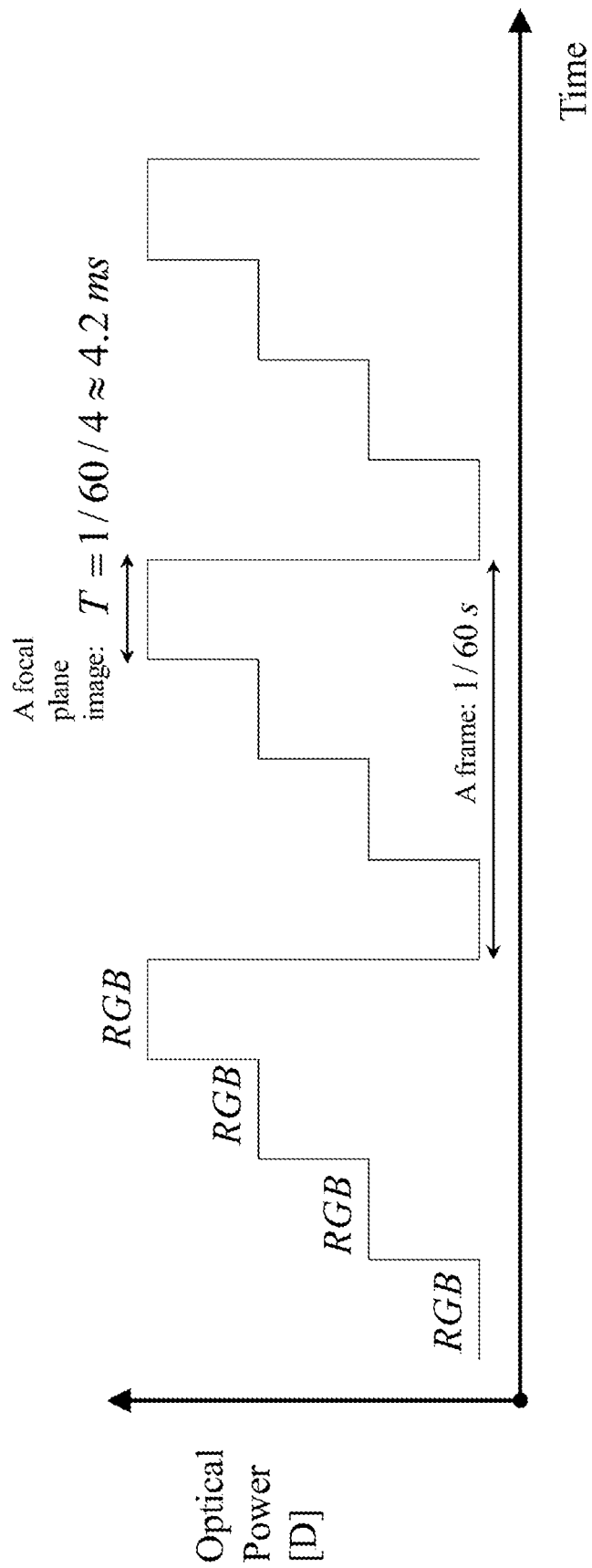
FIG. 9 shows schematically an optical power of a focus tunable lens changing over time for four focal planes of different index.

FIG. 7 shows how in a focus tunable optical system 100 according to an embodiment of the disclosure three different control signals 104 (Control Signals #1, #2, and #3) are applied to three lenses 102 of a compound lens 101, respectively (Lens #1, #2, #3). The three lenses 102 are arranged in series. A time delay 600 is added to two of the control signals 104 (here, Control Signals #2 and #3), thereby producing delayed control signals applied to the respective lenses 102. This produces delayed optical responses (here Optical Response #2 is delayed by a first time offset $\tau_1$ and Optical Response #3 is delayed by a second time offset $\tau_2$) of the two lenses 102. Again the optical responses of the three lenses 102 (Optical Responses #1, #2, #3) add up to produce an overall (i.e. combined) optical response of the compound lens 101. The first time delay $\tau_1$ is produced between a first lens 102 (Lens #1) and a second lens 102 (Lens #2). The second time delay $\tau_2$ is produced between the second lens (Lens #2) and the third lens (Lens #3) of the lens assembly. Preferably, for easy implementation, and for achieving best performance, the first delay $\tau_1$ and the second delay $\tau_2$ may be equal to another. That is, the controller 103 is configured to apply the control signals 104 to the three lenses 102 with equal time shifts between the two successive control signal 104 pairs. This holds also for more than three lenses 102, i.e. with equal time shifts between any two successive control signals 104.

Preferably, each of the focus tunable lenses 102 has the same natural oscillation frequency denoted and defined by 1/T, wherein T is the corresponding oscillation period. In this case, each of the equal time shifts ($\tau_1, \tau_2 \ldots$) preferably equals T/N where N is the number of focus tunable lenses 102 in the compound lens 101. For example, in the exemplary embodiment of FIG. 7, each time shift ($\tau_1, \tau_2$) would equal T/3. This would introduce a phase shift of 360°/N=120° between each two successive control signals 104. The oscillation effects of the lenses 102 can therefore be canceled out with respect to each other, at least they can be canceled out partially.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A focus tunable optical system, comprising:

a compound lens comprising a plurality of focus tunable lenses, each of the focus tunable lenses having an optical response with an oscillation artifact; and a controller configured to shift a focus of the compound lens from a first focal plane to a second focal plane by applying control signals to the plurality of focus tunable lenses, wherein applying the control signals comprises applying to each of the focus tunable lenses a respective control signal, the respective control signal having a first value for the first focal plane and a second value for the second focal plane, wherein the controller is configured to apply the control signals to the plurality of focus tunable lenses in a time-shifted manner, so that the applied control signals are time-shifted relative to each other.

2. The focus tunable optical system according to claim 1, wherein the applied control signals are time-shifted relative to each other so as to reduce an impact of oscillation artifacts of the focus tunable lenses.

3. The focus tunable optical system according to claim 1, wherein the controller is configured to apply the control signals to the plurality of focus tunable lenses in the time-shifted manner by use of one or more delay elements or by digital signal processing.

4. The focus tunable optical system according to claim 1, wherein the controller is configured to apply the control signals to the plurality of focus tunable lenses with an equal time shift between any two successive ones of the control signals.

5. The focus tunable optical system according to claim 4, wherein the focus tunable lenses have a same natural oscillation frequency f=1/T, T being a corresponding oscillation period, and the equal time shift equals T divided by a total number of focus tunable lenses included in the plurality of focus tunable lenses.

6. A multifocal display device, comprising:

a focus tunable optical system according to claim 1, wherein the controller is configured to selectively tune the focus of the compound lens to each focal plane of a plurality of N focal planes during a frame period, the focal planes comprising the first focal plane and the second focal plane.

7. The multifocal display device according to claim 6, further comprising:
a display element configured to generate an image,
wherein the controller is configured to control the display element to generate a different image for each of the focal plane indices during the frame period.

8. A method for controlling a focus tunable optical system, the focus tunable optical system comprising a compound lens comprising a plurality of focus tunable lenses, each of the focus tunable lenses having an optical response with an oscillation artifact, the method comprising:
shifting a focus of the compound lens from a first focal plane to a second focal plane by applying control signals to the focus tunable lenses,
wherein applying the control signals to the focus tunable lenses comprises applying to each of the focus tunable lenses a respective control signals, the respective control signal having a first value for the first focal plane and a second value for the second focal plane,
wherein the applied control signals are time-shifted relative to each other so as to reduce an impact of oscillation artifacts of the focus tunable lenses.

9. A non-transitory computer readable medium comprising a program code for controlling a focus tunable optical system according to the method of claim 8.

10. The focus tunable optical system of claim 1, wherein the oscillation artifact comprises an overshoot.

11. The focus tunable optical system of claim 1, wherein the oscillation artifact comprises an overshoot and ringing.

* * * * *